United States Patent
Cha et al.

(10) Patent No.: US 11,206,322 B2
(45) Date of Patent: Dec. 21, 2021

(54) MOBILE TERMINAL

(71) Applicant: LG ELECTRONICS INC., Seoul (KR)

(72) Inventors: Sunglyong Cha, Seoul (KR); Insu Song, Seoul (KR); Junghyun Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/023,284

(22) Filed: Sep. 16, 2020

(65) Prior Publication Data
US 2021/0099557 A1    Apr. 1, 2021

(30) Foreign Application Priority Data
Sep. 27, 2019    (KR) .......................... 10-2019-0120056

(51) Int. Cl.
*H04M 1/00*    (2006.01)
*H04M 1/02*    (2006.01)
*F16H 19/04*    (2006.01)

(52) U.S. Cl.
CPC ....... *H04M 1/0237* (2013.01); *H04M 1/0268* (2013.01); *F16H 19/04* (2013.01); *H04M 1/0264* (2013.01); *H04M 2250/12* (2013.01)

(58) Field of Classification Search
CPC combination set(s) only.
See application file for complete search history.

(56) References Cited

U.S. PATENT DOCUMENTS 8,103,321 B2 *   1/2012   Li .................... H04M 1/0237
                                                        455/575.4
8,593,801 B2 *  11/2013   Minowa .............. H04M 1/0237
                                                         361/679.3
(Continued)

FOREIGN PATENT DOCUMENTS

KR    10-2017-0076755         7/2017
KR    10-2017-0081559         7/2017
(Continued)

OTHER PUBLICATIONS

PCT International Application No. PCT/KR2020/010224, International Search Report dated Nov. 19, 2019, 11 pages.
(Continued)

*Primary Examiner* — Nhan T Le
(74) *Attorney, Agent, or Firm* — Lee Hong Degerman Kang & Waimey

(57) ABSTRACT

A mobile terminal comprising a first frame, a second frame coupled to the first frame and extendable with respect to the first frame in a first direction, wherein the second frame comprises a third rear portion and a first roller disposed on the third rear portion at a first end of the second frame in the first direction; a flexible display unit comprising a first end and being rolled around the first roller; a driving unit coupled to the first frame and moves the second frame in the first direction or in a second direction opposite to the first direction; and a connection band for curving around a first end of the third rear portion in the second direction, wherein the connection band has a first end connected to the driving unit and a second end coupled to a second end of the flexible display unit.

13 Claims, 11 Drawing Sheets

(56) References Cited

U.S. PATENT DOCUMENTS

| | | | | |
|---|---|---|---|---|
| 10,008,135 | B2* | 6/2018 | Lim | H05K 5/0226 |
| 10,742,784 | B1* | 8/2020 | Jo | H04M 1/0239 |
| 10,972,592 | B2* | 4/2021 | Song | H04M 1/0237 |
| 2020/0351393 | A1* | 11/2020 | Kang | H05K 1/028 |
| 2021/0044683 | A1* | 2/2021 | He | H04M 1/0268 |

FOREIGN PATENT DOCUMENTS

| | | |
|---|---|---|
| KR | 10-2017-0141438 | 12/2017 |
| KR | 1020170141438 | 12/2017 |
| KR | 10-2019-0062855 | 6/2019 |
| KR | 1020190062855 | 6/2019 |
| KR | 10-2019-0077107 | 7/2019 |
| KR | 1020190077107 | 7/2019 |

OTHER PUBLICATIONS

Korean Intellectual Property Office Application No. 10-2019-0120056, Office Action dated Jun. 21, 2020, 5 pages.

\* cited by examiner

[FIG. 1]
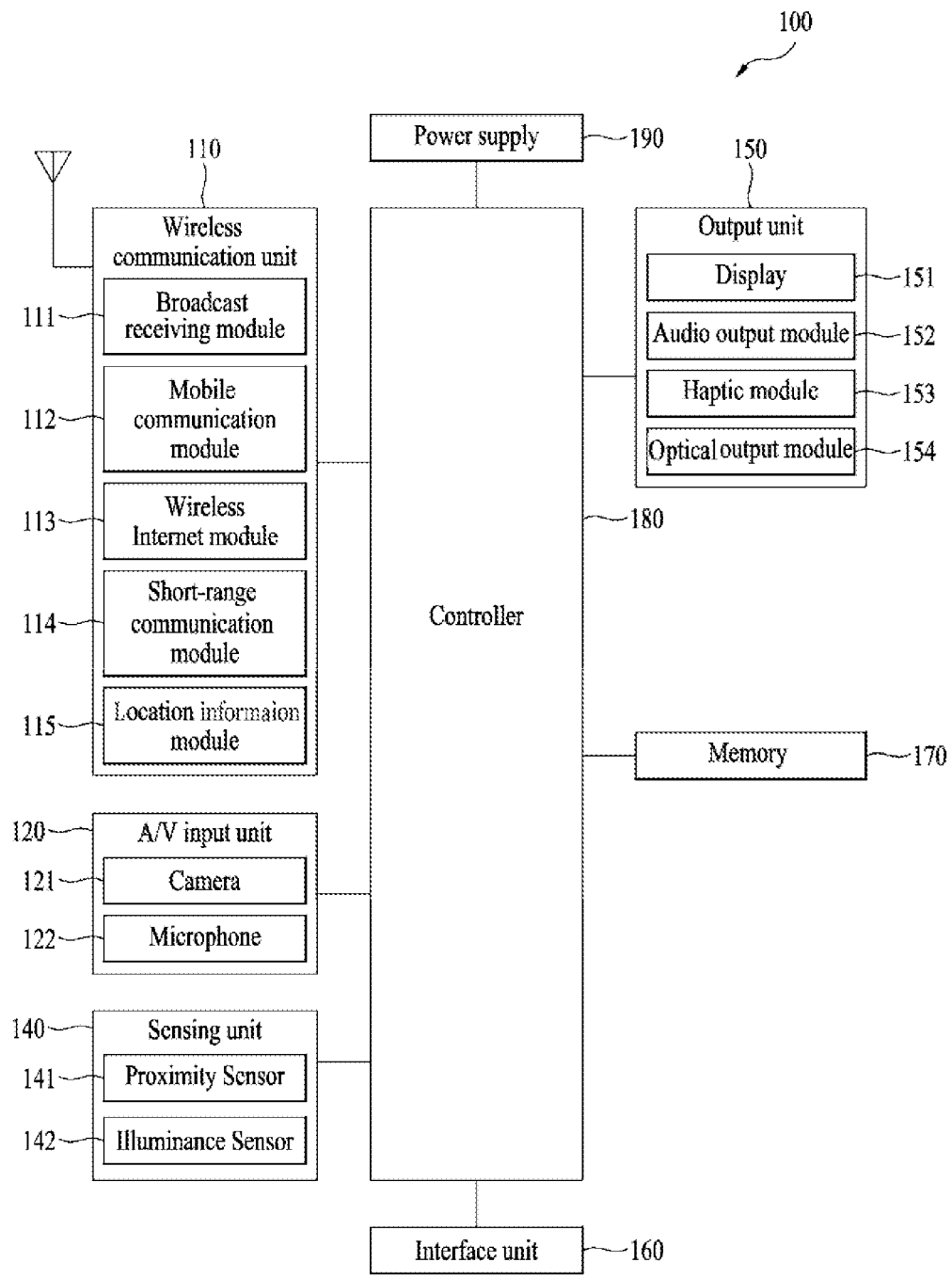

[FIG. 2]
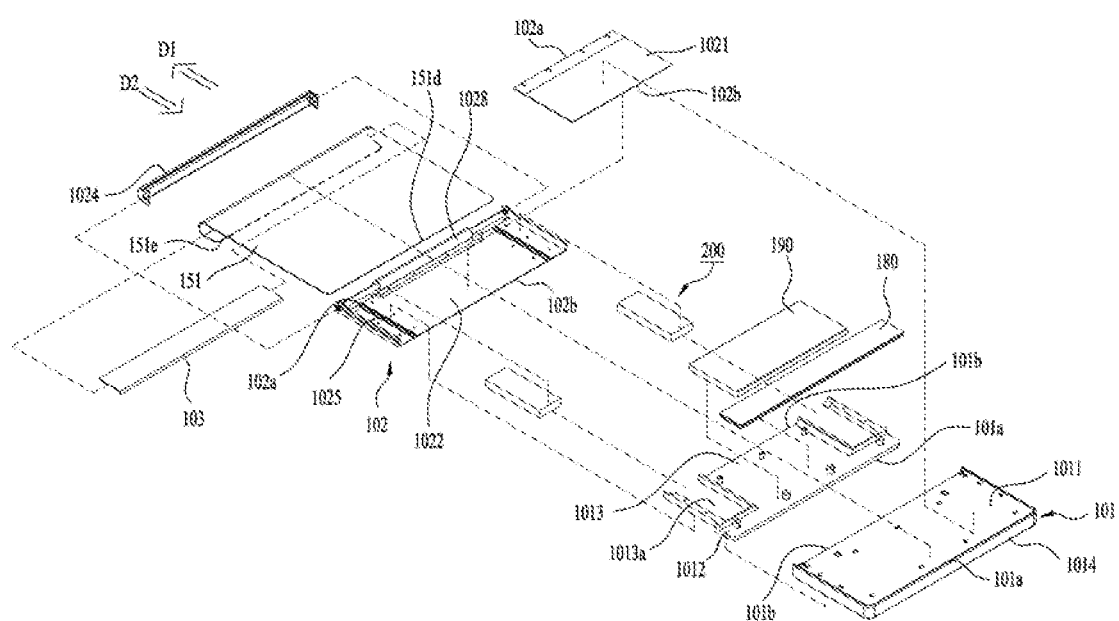

[FIG. 3]
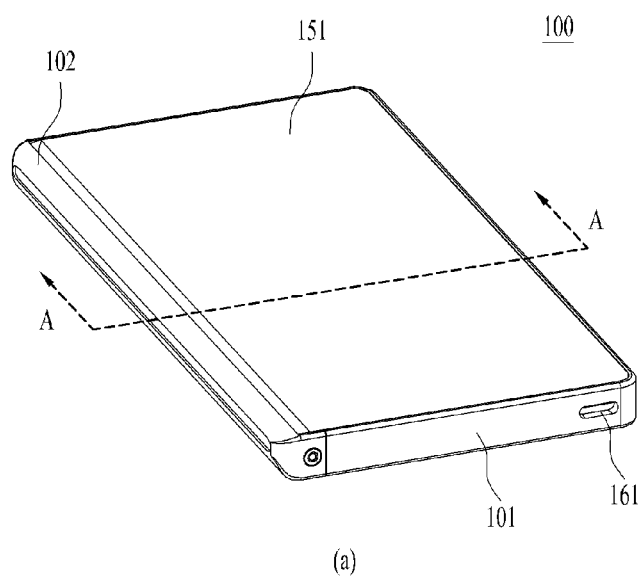
(a)
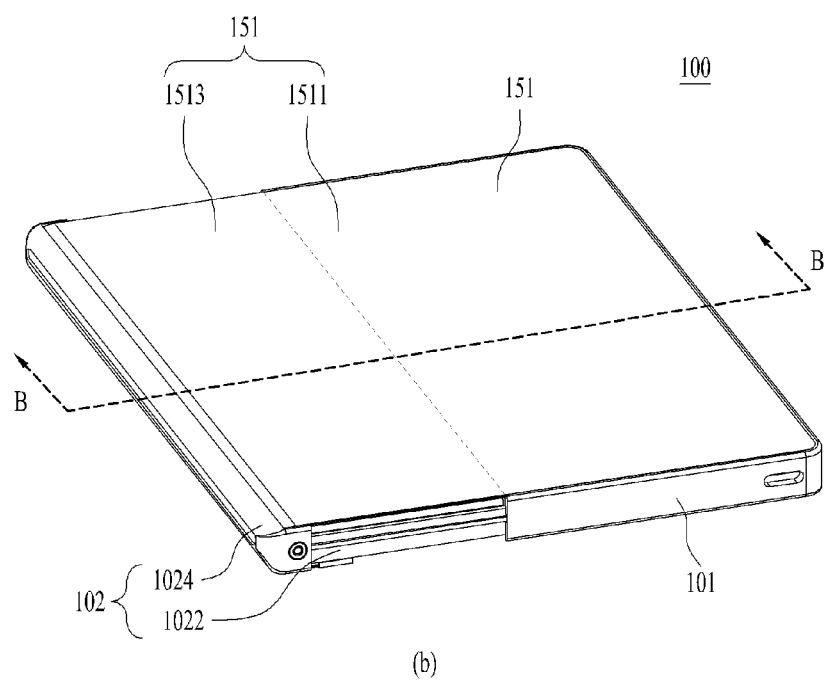
(b)

[FIG. 4]
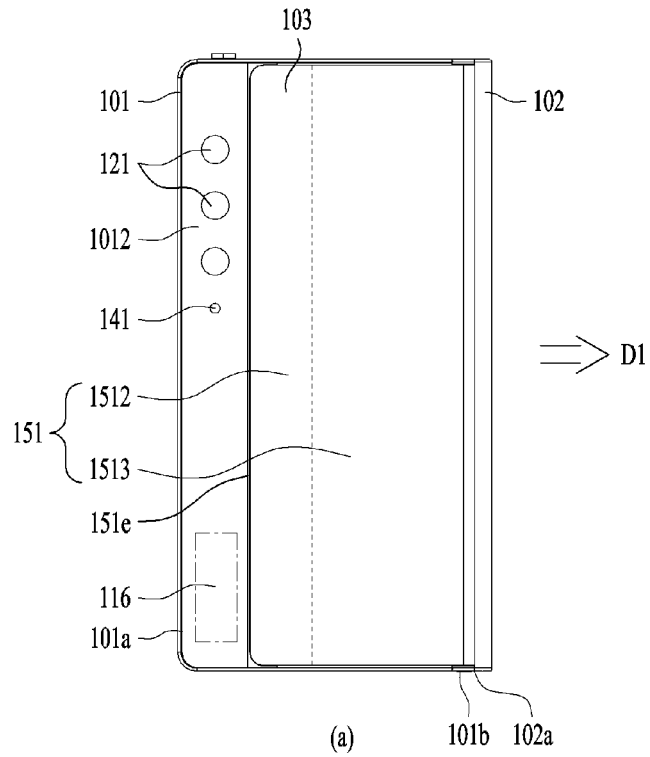
(a)
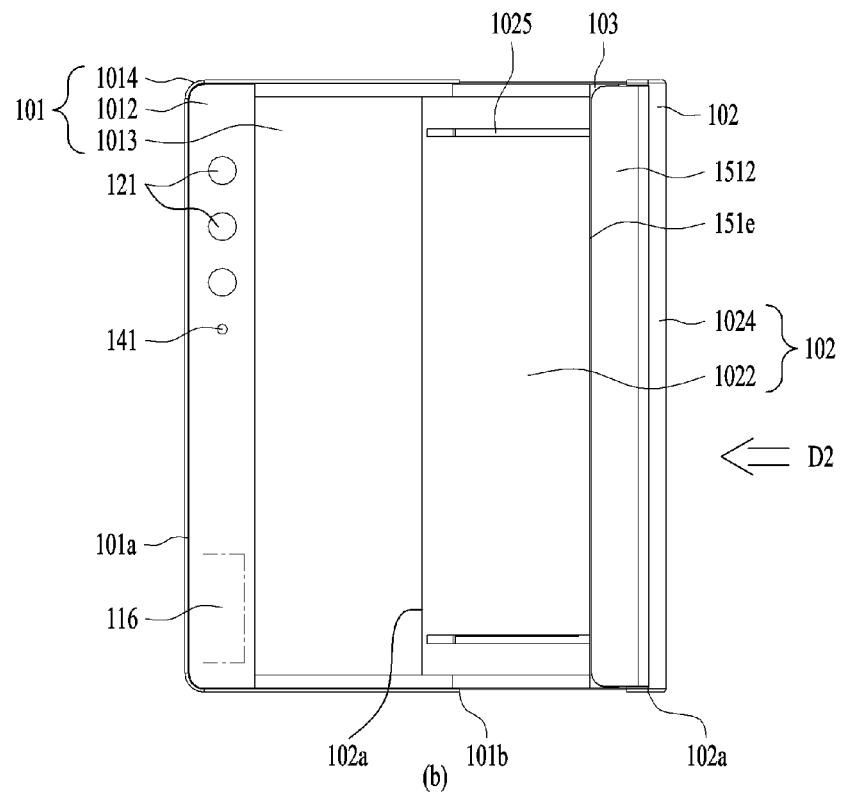
(b)

[FIG. 5]
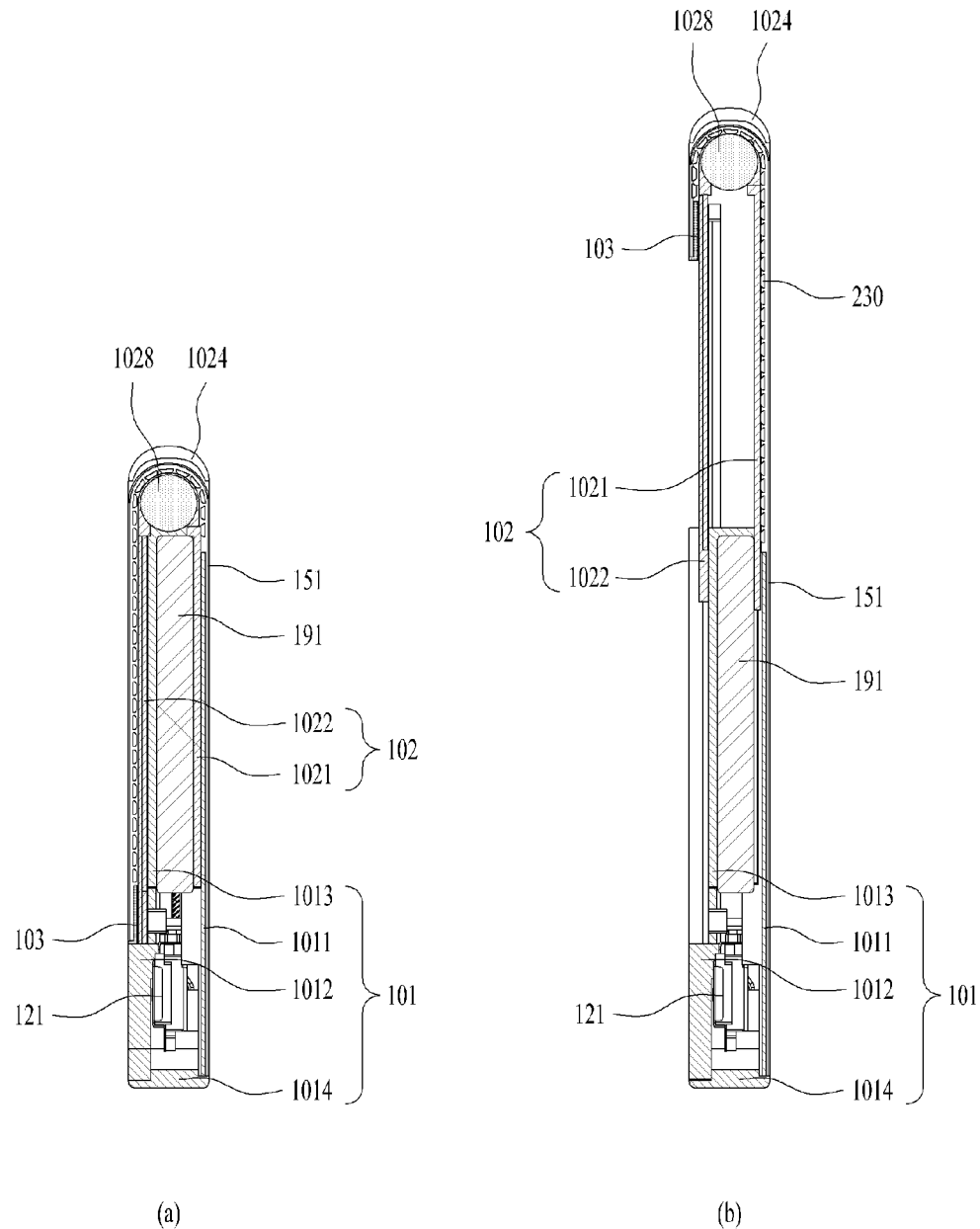
(a)  (b)

[FIG. 6]
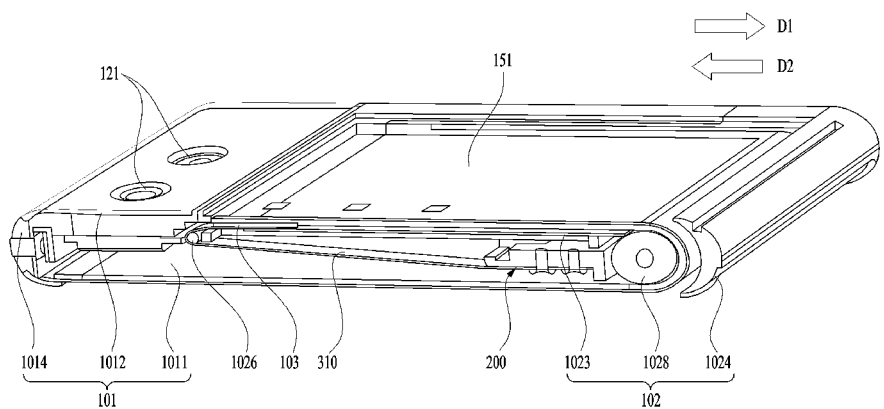
[FIG. 7]
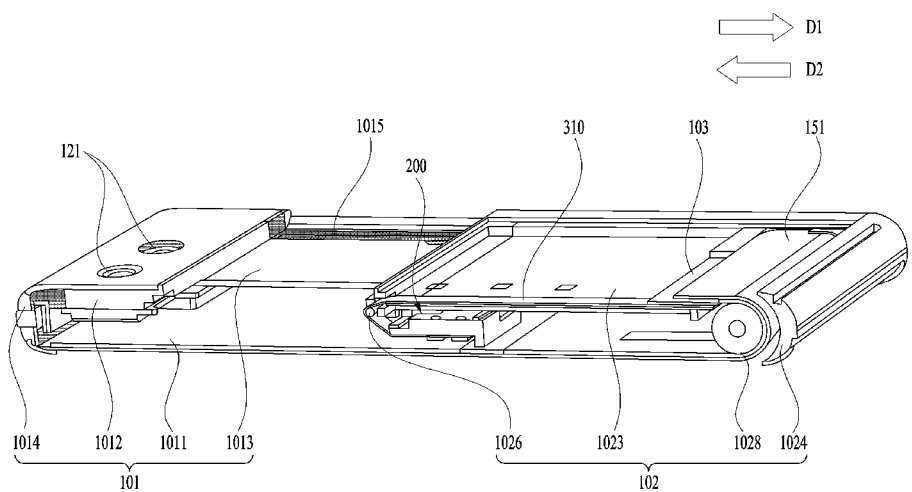

[FIG. 8]
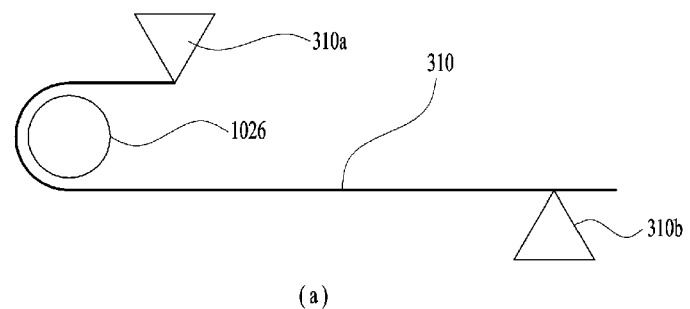
(a)
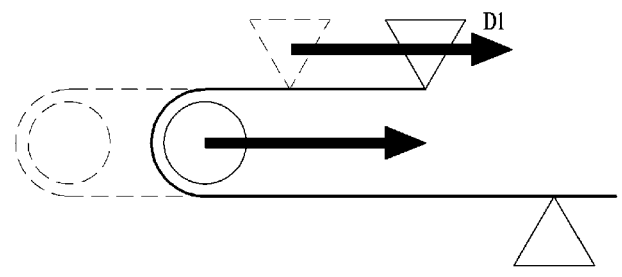
(b)
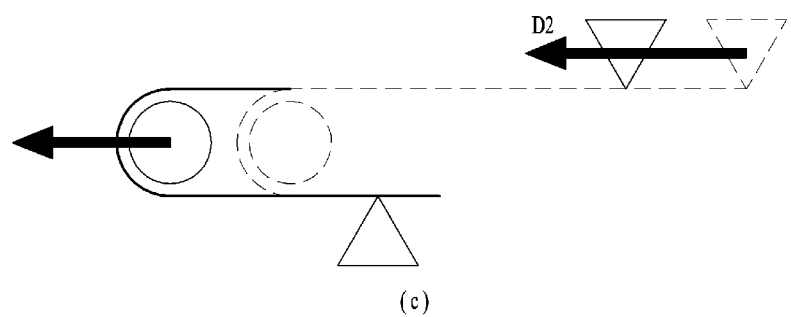
(c)

[FIG. 9]
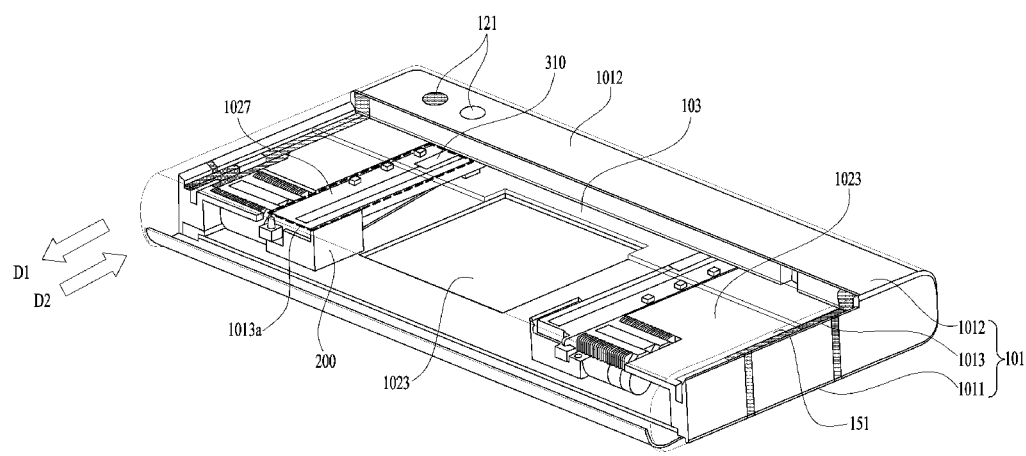
[FIG. 10]
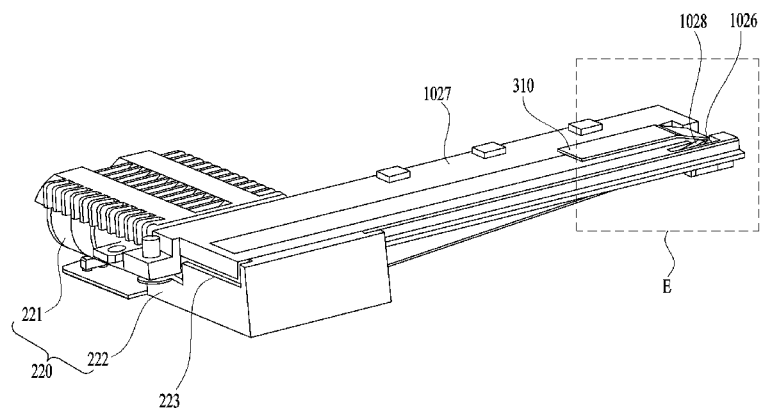

[FIG. 11]
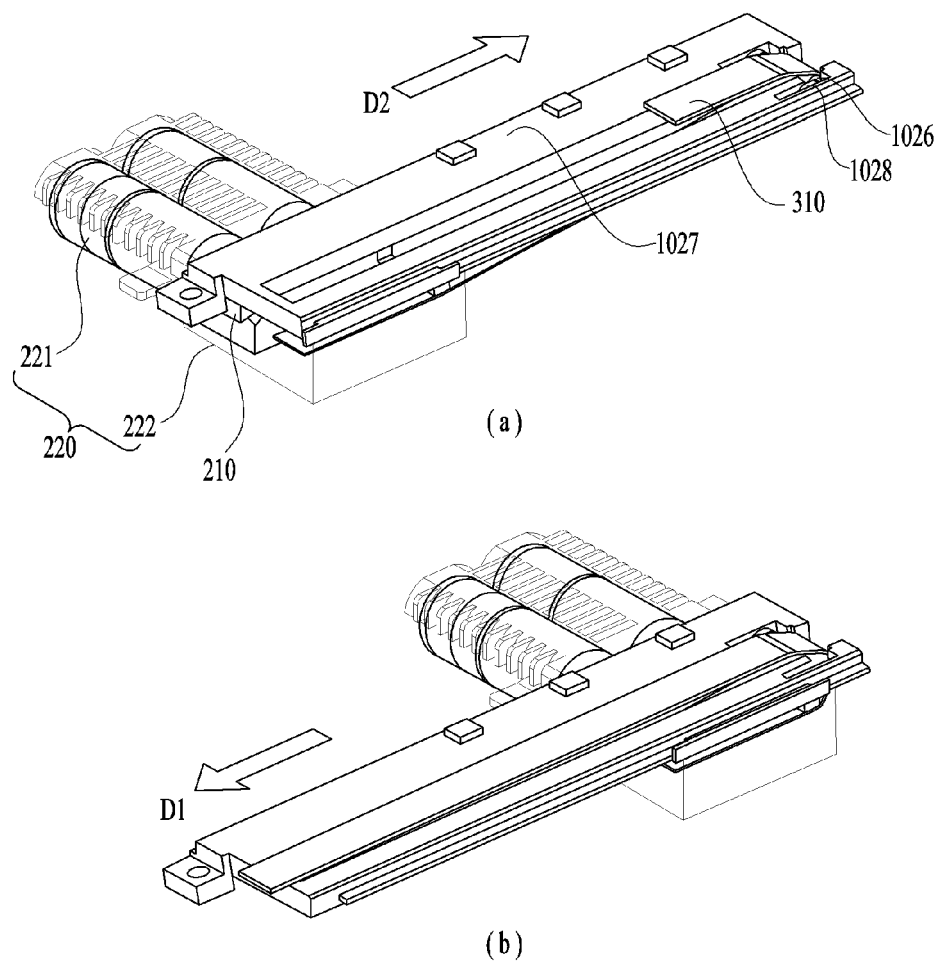

[FIG. 12]
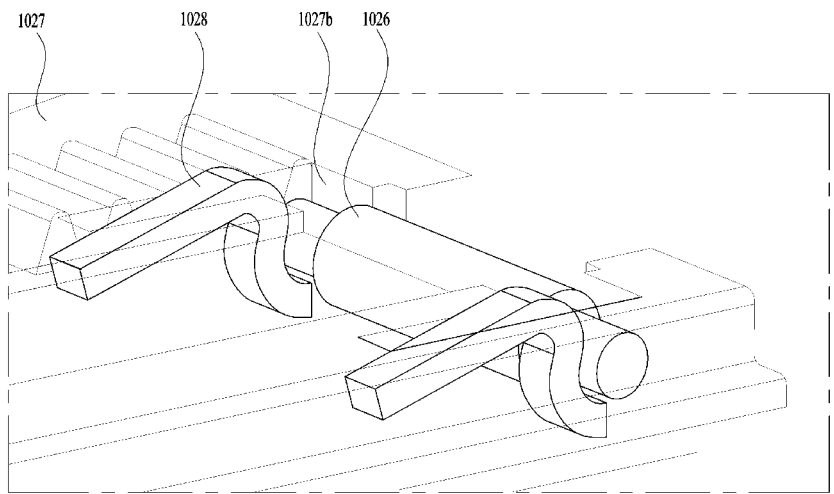
[FIG. 13]
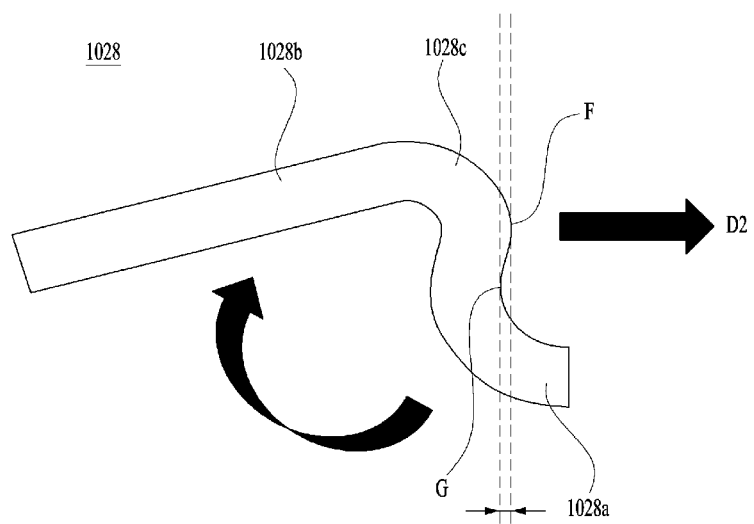

[FIG. 14]
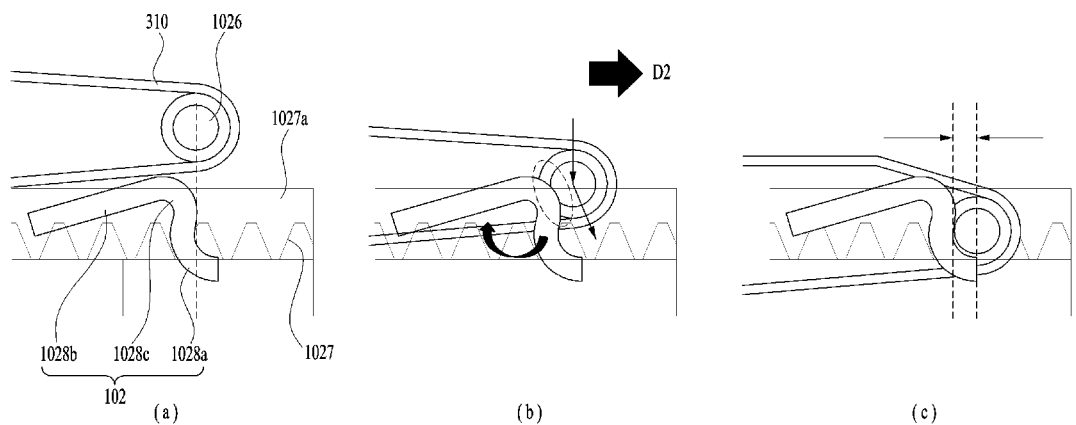
[FIG. 15]
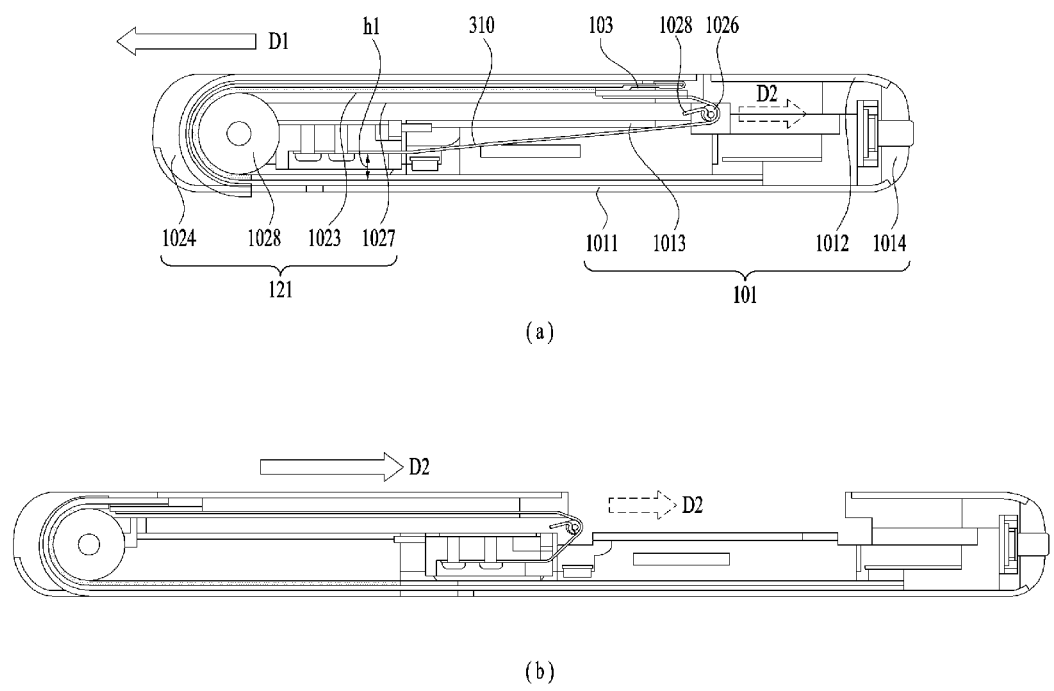

MOBILE TERMINAL

CROSS-REFERENCE TO RELATED APPLICATION(S)

Pursuant to 35 U.S.C. § 119(a), this application claims the benefit of earlier filing date and right of priority to Korean Patent Application No. 10-2019-0120056, filed on Sep. 27, 2019, the contents of which are hereby incorporated by reference herein in its entirety.

BACKGROUND

Field

The present disclosure relates to a mobile terminal and to a mobile terminal having a flexible display.

Discussion of the Related Art

Terminals may be generally classified as mobile/portable terminals or stationary terminals according to their mobility. Mobile terminals may also be classified as handheld terminals or vehicle mounted terminals according to whether or not a user may directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

Recently, a flexible display, which has sufficient elasticity, and thus, be able to be deformed largely, has been developed. A size of the mobile terminal may be varied using a deforming property of the flexible display. In the mobile terminal having such a variable structure, a change in the structure of the mobile terminal must be performed stably. Further, a support structure and the like of the variable display unit may be a problem.

SUMMARY

One purpose of the present disclosure is to provide a mobile terminal having a structure for assisting a slide movement.

One aspect of the present disclosure proposes a mobile terminal including a first frame, a second frame coupled to the first frame in a manner of being extendable in a first direction, wherein the second frame includes a third rear portion moving along a rear face of the first frame and a first roller disposed on the third rear portion at an end in the first direction of the second frame, a flexible display unit having one end fixed to a front face of the first frame and surrounding the first roller, a driving unit fixed to the first frame and moving the second frame in the first direction or in a second direction opposite to the first direction, and a connection band for surrounding an end in the second direction of the third rear portion, wherein the connection band has one end connected to the driving unit and the other end fixed to the other end of the flexible display unit.

In one implementation, the connection band may have a uniform length, and may provide a tension in the second direction to the other end of the flexible display unit.

In one implementation, the mobile terminal may further include a third frame connected to the other end of the flexible display unit, and moving in the first direction or in the second direction along a rear face of the third rear portion, wherein the other end of the connection band may be coupled to an end in the second direction of the third frame.

In one implementation, the third rear portion may include a second roller surrounded by the connection band and rotating at the end in the second direction of the third rear portion.

In one implementation, the third rear portion may include a support member for providing elasticity in the second direction to the second roller.

In one implementation, the support member may include a shaft fixing portion for surrounding at least a portion of a rotating shaft of the second roller, and a shaft support portion for elastically supporting the shaft fixing portion in the second direction.

In one implementation, the shaft fixing portion and the shaft support portion may be integrally formed by bending a single metal member in the support member.

In one implementation, a connection portion for connecting the shaft fixing portion and the shaft support portion with each other may be formed to be directed in the second direction in the support member.

In one implementation, the driving unit may include a pinion gear for rotating in the first direction or in the second direction, and a motor assembly for controlling the rotation of the pinion gear, wherein the third rear portion may include a rack gear engaged with the pinion gear on a front face thereof.

In one implementation, the second roller may be disposed at an end in the second direction of the rack gear.

In one implementation, the first frame may include a first front portion for fixing the one end of the flexible display unit thereto, and a second rear portion spaced apart from the first front portion to define therebetween a mounting space for mounting the driving unit therein, wherein the second rear portion is in contact with the third rear portion, wherein the second rear portion may include a guide hole for inserting the rack gear therein and for guiding a movement of the rack gear in the first direction or in the second direction.

In one implementation, the motor assembly may include a motor for providing a rotation power to the pinion gear, and a motor casing for mounting the motor therein, wherein the motor casing may include a guide groove for supporting the rack gear and guiding the movement of the rack gear in the first direction or in the second direction.

In one implementation, the motor casing may include a connection portion to be connected to the one end of the connection band, wherein the connection portion may be spaced apart from a rear face of the first front portion.

The mobile terminal according to the present disclosure may prevent a wrinkle from occurring on the flexible display unit whose shape is variable in response to expansion and contraction of the frame.

The mobile terminal according to the present disclosure may easily couple a member that provides a tension to the flexible display unit.

The mobile terminal according to the present disclosure may prevent increase in a volume thereof by allowing a mounting space to be less reduced using a member that provides a tension to the flexible display unit.

An additional scope of applicability of the present disclosure will become apparent from a detailed description below. However, various changes and modifications within the spirit and scope of the present disclosure may be clearly understood by those skilled in the art, so that it should be understood that the detailed description and certain embodiments, such as preferred embodiments of the present disclosure, are given by way of illustration only.

BRIEF DESCRIPTION OF DRAWINGS

FIG. 1 is a block diagram of a mobile terminal in accordance with the present disclosure.

FIG. 2 is an exploded perspective view of a mobile terminal in accordance with the present disclosure.

FIG. 3 shows perspective views respectively illustrating a first state and a second state viewed from one side of a mobile terminal in accordance with the present disclosure.

FIG. 4 shows rear face views respectively illustrating a first state and a second state of a mobile terminal in accordance with the present disclosure.

FIG. 5 shows cross-sectional views respectively taken along a line A-A and a line B-B of FIG. 3.

FIGS. 6 and 7 are cross-sectional perspective views of a section including a connection band in a mobile terminal in accordance with the present disclosure.

FIG. 8 is a conceptual diagram for describing an operation of a connection band that provides a tension to a flexible display unit in a mobile terminal in accordance with the present disclosure.

FIG. 9 is a transparent perspective view for describing a connection structure of a connection band in a mobile terminal in accordance with the present disclosure.

FIG. 10 is a perspective view of some components expanded and viewed from one direction in a mobile terminal in accordance with the present disclosure.

FIG. 11 is a perspective view illustrating some components illustrated in FIG. 10 in a manner of dividing the components based on an operation state, in a mobile terminal in accordance with the present disclosure.

FIG. 12 is a transparent perspective view of an enlarged portion E in FIG. 11 in the mobile terminal in accordance with the present disclosure.

FIG. 13 is an enlarged side view of a component in FIG. 12 in the mobile terminal in accordance with the present disclosure.

FIG. 14 is a conceptual diagram for describing a function of some components in FIG. 13 in the mobile terminal in accordance with the present disclosure.

FIG. 15 is a cross-sectional view including a connection band in a mobile terminal in accordance with the present disclosure.

DETAILED DESCRIPTIONS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications for example, Global System for Mobile Communication GSM, Code Division Multi Access CDMA, CDMA2000 Code Division Multi Access 2000, EV-DO Enhanced Voice-Data Optimized or Enhanced Voice-Data Only, Wideband CDMA WCDMA, High Speed Downlink Packet access HSDPA, HSUPA High Speed Uplink Packet Access, Long Term Evolution LTE, LTE-A Long Term Evolution-Advanced, and the like.

Examples of wireless signals transmitted and/or received via the mobile communication module 112 include audio call signals, video telephony call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN WLAN, Wireless Fidelity Wi-Fi, Wi-Fi Direct, Digital Living Network Alliance DLNA, Wireless Broadband WiBro, Worldwide Interoperability for Microwave Access WiMAX, High Speed Downlink Packet Access HSDPA, HSUPA High Speed Uplink Packet Access, Long Term Evolution LTE, LTE-A Long Term Evolution-Advanced, and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency Identifications RFID, Infrared Data Association IrDA, Ultra-WideBand UWB, ZigBee, Near Field Communication NFC, Wireless-Fidelity Wi-Fi, Wi-Fi Direct, Wireless USB Wireless Universal Serial Bus, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 or an external server is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System GPS module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point AP which transmits or receives a wireless signal to or from the Wi-Fi module.

The input unit 120 includes a camera 121 for obtaining images or video, a microphone 122, which is one type of audio input device for inputting an audio signal, and a user input unit 123 for example, a touch key, a push key, a mechanical key, a soft key, and the like for allowing a user to input information. Data for example, audio, video, image, and the like is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element for example, a key, a button located on a front and/or rear surface or a side surface of the mobile terminal 100, a dome switch, a jog wheel, a jog switch, and the like, or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared IR sensor, a finger scan sensor, a ultrasonic sensor, an optical sensor for example, camera 121, a microphone 122, a battery gauge, an environment sensor for example, a barometer, a hygrometer, a thermometer, a radiation detection sensor, a thermal sensor, and a gas sensor, among others, and a chemical sensor for example, an electronic nose, a health care sensor, a biometric sensor, and the like, to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function e.g., a call signal reception sound, a message reception sound, etc. performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output I/O ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 for example, receiving a call, placing a call, receiving a message, sending a message, and the like. It is common for application programs to be stored in the memory 170, installed in the mobile terminal 100, and executed by the controller 180 to perform an operation or function for the mobile terminal 100.

The controller 180 typically functions to control overall operation of the mobile terminal 100, in addition to the operations associated with the application programs The controller 180 may provide or process information or functions appropriate for a user by processing signals, data, information and the like, which are input or output by the various components depicted in FIG. 1, or activating application programs stored in the memory 170.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3A, 4A, and 5A show a first state of the mobile terminal, and FIGS. 3B, 4B, and 5B show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, a size of the mobile terminal 100 and a size of the front face of the display unit 151 become larger than that in the first state as shown in FIG. 3B, and a size of the rear face of the display unit 151 is reduced as shown in FIG. 4B. That is, the display unit 151 positioned on the rear face of the mobile terminal 151 in the first state moves to the front face of the mobile terminal 100 in the second state.

In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed e.g., a state of having an infinite curvature radius, hereinafter referred to as a basic state, a display region of the flexible display unit 151 becomes flat. In a state in which the flexible display unit 151 is deformed by an external force from the basic state e.g., a state of having a finite radius of curvature, hereinafter referred to as a deformed state, the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state e.g., a vertically or horizontally curved state rather than a flat state in the basic state. In this case, when the external force is applied to the flexible display unit 151, the flexible display unit 151 may be deformed into the flat state or a less curved state or more curved state.

The flexible display unit 151 may be combined with a touch sensor to implement a flexible touch screen. When a touch is made on the flexible touch screen, the controller 180 see FIG. 1 may perform control corresponding to such touch input. The flexible touch screen may be configured to detect the touch input in the deformed state as well as in the basic state.

The touch sensor detects the touch or touch input applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 see FIG. 1.

The deformation detection means may be disposed in the flexible display unit 151 or a case first to second frames 101 to 102 to be described later to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion first or second state of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 according to the present disclosure is bent 180 degrees while being rolled on a side of the mobile terminal 100 in the first direction. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display AOD is an antenna in which a transparent film is formed by stacking an electrode layer and a dielectric layer that have patterns engraved thereon, respectively. The antenna on display may be implemented thinner than an antenna implemented using a laser direct structuring LDS technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Referring to FIGS. 2 to 5, a detailed configuration of the mobile terminal 100 according to the present disclosure will be described in detail below. In a following description, FIG. 2 illustrating an overall configuration is basically referred to, and FIGS. 3 to 5 are referred to describe detailed features of corresponding components in the first and second states of the mobile terminal 100.

The mobile terminal 100 according to the present disclosure includes frames 101 and 102 in which components are mounted, and the frames 101 and 102 according to the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 according to the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, rear portions, and side portions, respectively, and are coupled to each other. Thus, the mobile terminal 100 may have a hexahedral outer shape by such coupled first and second frames 101 and 102.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a side portion 1014. The side portion 1014 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a uniform shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region 1511 of the display unit 151 may be coupled to the first front portion 1011 corresponding to the front face of the mobile terminal 100.

In one example, as illustrated well in FIG. 4, the various physical input units 120 and the sensing unit 140 for manipulation of the mobile terminal 100 may be located on the first rear portion 1012, and the display unit 151 may be disposed only on a second rear portion 1013. The first rear portion 1012 is not overlapped with the flexible display unit 151 regardless of the state of the mobile terminal, and is always exposed to the outside. Thus, the input unit 120 such as various buttons, a switch, the camera 121, and a flash, and the sensing unit 140 such as a proximity sensor 141 may be disposed on the first rear portion 1012. In a usual bar-type terminal, a display unit is provided only on a front face of a terminal. Therefore, in order for a user to photograph an object on the other side while viewing the display unit, a main camera is disposed on a rear face of the terminal. In one example, in order for the user to photograph while viewing himself through the display unit, an auxiliary camera is additionally required on the front face of the terminal.

However, in the mobile terminal 100 according to the present disclosure, the display unit 151 is located on both the front face and the rear face of the terminal. Therefore, when the user photographs himself, a display unit on the same face as the camera 121, that is, a portion of the display unit 151 on the rear face of the mobile terminal 100 in the drawing may be used. When the user photographs the object on the other side of the user, a display unit on an opposite side to the camera 121, that is, a portion of the display unit 151 on the front face of the mobile terminal 100 in the drawing may be used. For this reason, the mobile terminal 100 may use one camera 121 to photograph the object located on the opposite side of the user or to photograph the user. The camera may include a plurality of cameras having different angles of view, such as a wide angle, a super wide angle, a telephoto, and the like. In addition to the camera, the proximity sensor, a sound output unit, and the like may be located on the first rear portion 1012, and an antenna 116 may be installed on the first rear portion 1012.

The side portion 1014 may extend along edges of the first front portion 1011 and the first rear portion 1012/the second rear portion 1013 so as to surround a perimeter of the first frame 101, and may form an outer shape of the mobile terminal 100. However, as mentioned above, the second frame 102 is accommodated in the first frame 101 and is also movably coupled to the first frame 101. Thus, in order to allow a relative movement of the second frame 102 for the first frame 101, a portion of the first frame 101 needs to be opened. As well illustrated in FIG. 2, as an example, the second frame 102 is movably coupled to one of both side portions of the first frame 101, so that the first frame 101 may include a first side portion 101*a* that is substantially closed and a second side portion 101*b* that is disposed opposite to the first side portion 101*a* and opened. Because the side portion 1014 is exposed to the outside of the mobile terminal 100, the interface unit 160 for connecting a power port or an ear jack, the user input unit 120 such as a volume button, and the like may be arranged thereon. When the side portion 1014 contains a metal material, the side portion 1014 may serve as an antenna.

The second rear portion 1013 of the first frame 101 may be covered by the display unit, but may also be disposed on the front face of the display unit using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1022 may be made of a substantially flat plate-shaped member. In addition, the second frame 102 accommodates various components therein, and should not interfere with components accommodated in the first frame 101 during a movement. Therefore, the second front portion 1021 and the third rear portion 1022 may be coupled to each other in a state of being spaced apart from each other to define a predetermined space therebetween, and may have a shape that does not interfere with the components in the first frame 101.

In addition, the display unit 151 may be bent 180 degrees while being wound inside the second frame 102 so as to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 must be spread flat on the front face and rear face of the mobile terminal 100 in order to provide a good quality screen to the user. For such spread, an adequate tension must be provided to the display unit 151. In order to provide the adequate tension, the roller 1028 may be disposed at a first directional end of the second frame 102. Such roller 1028 may be extended in the second direction, and may be rotatably coupled to the second frame 102.

The display unit 151 may be wound on the roller 1028 while gently bending with a predetermined curvature. The flexible display unit 151 may include a first face on which an image is output and is exposed to the outside, and an inner face facing the frame on the opposite side. The roller 1028 may be installed to freely rotate in the second frame 102 while being in contact with the inner face of the display unit 151. Therefore, the roller 1028 may actually move the display unit 151 in a lateral direction, that is a direction perpendicular to a longitudinal direction of the mobile terminal 100. As will be described below, when the second frame 102 slides, the display unit 151 may move to the front face or the rear face of the mobile terminal 100 relative to the second frame 102 in different directions (i.e., the first direction D1 or the second direction D2) by the tension applied by the second frame 102. The roller 1028 may guide such movement while rotating.

In addition, the roller 1028 is disposed on a first side portion 102*a* of the second frame 102, and the first side portion 102*a* actually corresponds to an outermost side portion of the mobile terminal 100. When the first side portion 102*a* of the second frame 102 is exposed, the display unit 151 wound on the roller 1028 may be damaged. Accordingly, the second frame 102 may include a side frame 1024 disposed on the first side portion 102*a*.

The side frame 1024 may extend in a longitudinal direction of the second frame 102 to cover the first side portion 102*a*, thereby protecting the roller 1028 and the display unit 151 wound on the roller 1028. That is, the side frame 1024 covers the side face of the display unit 151, and the side face is located in a third region. The first region 1511 to the third region are respectively located at specified positions and do not change in size or position, but sizes of the front face and rear face and a position of the side face of the display unit 151 are determined based on a state of a main frame.

The first region 1511 and the second region 1512 correspond to the aforementioned fixed portion, and the third region 1513 corresponds to the aforementioned variable portion.

The position of the third region 1513 may vary based on the state of the mobile terminal. Because the side face is wound by the roller, the side face may be bent with a predetermined curvature, and an inner face of the side frame may have a curved face corresponding to the curvature of the side face.

The second frame 102 may have the substantially closed first side portion 102*a* by such side frame 1024, and the side frame 1024 may substantially form the outer shape of the mobile terminal 100 together with the side portion 1014 of the first frame 101. In addition, in order to minimize interference with the components in the first frame 101 during the movement, the second frame 102 may include a second side portion 102*b* disposed opposite to the first side portion 102*a* and opened.

Such second frame 102 may be movably coupled to the first frame 101, and accordingly, may slide in the predetermined first or second direction D1 or D2 with respect to the first frame 101. More specifically, as described above, the second frame 102 may be movably coupled to the first frame 101 through the side portion of the first frame 101, precisely through the open second side portion 101*b*. More specifically, the second side portion 102*b* of the second frame may be disposed relatively adjacent to the first side portion 101*a* of the first frame 101 to be closed. Accordingly, the first side portion 102*a* of the second frame may be disposed opposite to the first side portion 101*a*. Accordingly, the second side portion 102*b* may be inserted into the first frame 101 through the side portion of the first frame, that is, the second side portion 101*b* thereof. The first side portion 102*a* may not be inserted into the first frame 101 and may always be located outside the first frame 101. Accordingly, as described above, the first side portion 102*a* may form the outer shape of the mobile terminal 100. However, if necessary, such first side portion 102*a* of the second frame 102 may also be inserted into the first frame 101.

Because of such positional relationship, the second frame 102 may be expanded from or contracted into the first frame 101 in a direction perpendicular to the longitudinal direction of the mobile terminal 100 or the first frame 101. That is, the first and second directions D1 and D2 may be basically directions perpendicular to the longitudinal direction of the mobile terminal 100 or the first frame 101. In one example, the first and second directions D1 and D2 may also be described as a lateral direction or a horizontal direction of the mobile terminal 100 or the first frame 101. In addition, in the movement in the first direction D1, the second frame 102 is extended from the first frame 101. Accordingly, the first direction D1 may be a direction in which the second frame 102 moves away from the first frame 101, that is, outwardly of the mobile terminal 100 or the first frame 101. On the other hand, in the movement in the second direction D2, the second frame 102 is contracted into the first frame 101. Therefore, the second direction D2 may be a direction opposite to the first direction D1. In addition, the second direction D2 may be a direction in which the second frame 102 moves to be closer to the first frame 101, that is, inwardly of the mobile terminal 100 or the first frame 101. When moved in the first direction D1, such second frame 102 may be expanded, may apply a force to the portion of the display unit 151 that was disposed on the rear face of the mobile terminal 100 to additionally dispose the portion of the display unit 151 on the front face of the mobile terminal 100, and may define a region for such additional disposition. Accordingly, the second frame 102 may switch the state of the mobile terminal 100 to the second state having a relatively expanded front face display unit 151 by the movement in the first direction D1. On the other hand, when moved in the second direction D2, the second frame 102 may be contracted to an original state, and may apply a force to the portion of the display unit 151 that was disposed on the front face of the mobile terminal 100 to return the portion of the display unit 151 to the rear face of the mobile terminal 100 again. Accordingly, the second frame 102 may switch the state of the mobile terminal 100 to the first state having a relatively reduced front face display unit 151 by the movement in the second direction D2. Therefore, the second frame 102 may selectively expose the display unit 151 on the front face of the mobile terminal 100 based on to the movement direction (i.e., the first or the second direction D1 or D2), and accordingly, switch the state of the mobile terminal 100 to the first or the second state defined above.

During such expansion and contraction in the first and the second directions D1 and D2, the second frame 102 may overlap with the first frame 101, precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. When the second front portion 1021 is interposed between the first front portion 1011 and the display unit 151, the display unit 151 may rather be deformed or damaged due to friction between the second front portion 1021 that moves repeatedly. Accordingly, the second front portion 1021 may be disposed below the first front portion 1011 as illustrated well in FIG. 5. That is, a front face of the second front portion 1021 may face a rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, a front face of the third rear portion 1022 may face a rear face of the second rear portion 1013. In addition, the rear face of the second rear portion 1013 may be in contact with the front face of the third rear portion 1022 to stably support the movement of the second frame 102. By such arrangement, the third rear portion 1022 may be exposed to the outside of the first frame, precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be located rearward of the third rear portion 1022 of the second frame, and the flexible display unit may be located between the second rear portion 1013 and the third rear portion 1022 in the first state.

When the second rear portion 1013 forms the outer shape of the rear face of the mobile terminal using a material such as transparent glass, the first rear portion 1012 may be implemented using the same member as the second rear portion 1013. That is, a plate-shaped member made of the transparent glass may be partially coated such that the internal components are not visible and the coating may be omitted only for a necessary portion to arrange the camera 121, the flash, the sensing unit 140, or the like.

In addition, the second frame 102 may expand and contract the mobile terminal 100 itself, particularly, the front face of the mobile terminal 100 by the expansion and the contraction in the first and the second directions D1 and D2. The display unit 151 must move by such the expanded or contracted front face to obtain the intended first and second states. However, when fixed to the second frame 102, the display unit 151 may not be moved smoothly based on the front face of the mobile terminal 100 that is expanded or reduced. For this reason, the display unit 151 may be movably coupled to the second frame 102. More specifically, the display unit 151 may include a first side end 151d disposed on the front face of the mobile terminal 100 and a second side end 151e opposite to the first side end 151d and disposed on the rear face of the mobile terminal 100. The first side end 151d may be disposed on the front face of the first frame 101, that is, a front face of the first front portion 1011, and may be disposed adjacent to the side portion of the mobile terminal 100, that is, the first side portion 101a of the first frame. On the other hand, because the second end 151e is adjacent to the rear face of the mobile terminal 100, that is, the third rear portion 1022 of the second frame 102, the second end 151e may be coupled to the third rear portion 1022 of the second frame 102 in a manner of being movable in the first and second directions D1 and D2. In addition, the display unit 151 is not structurally strong, so that a third frame 103 may be coupled to such second end 151e. The third frame 103 may be formed of a plate-shaped member extending in the longitudinal direction of the mobile terminal 100. Accordingly, the third frame 103 may be coupled to the second frame, that is, the third rear portion 1022 of the second frame in a manner of being movable in the first and second directions D1 and D2, in place of the second end 151e. In addition, the second frame 102 may include a slot 1025 extending in the lateral direction of the mobile terminal 100 or the second frame, that is, a direction perpendicular to the longitudinal direction of the mobile terminal 100 or the second frame. The third frame 103 may be stably moved while being guided by the slot 1025. The third frame 103 may include, for example, a protrusion inserted into the slot 1025 for the movement along the slot 1025.

Referring to FIGS. 3 to 5, in connection with the configuration of the first to third frames 101, 102, and 103, the display unit 151 may include the first region 1511 extending from one side of the display 151, that is, the first side end 151d to the second side end 151e opposite to the first side end 151d with a predetermined length, and the second region 1512 disposed opposite to the first region 1511 and extending from the second side end 151*e* to the first side end 151*d* with a predetermined length. In addition, the display unit 151 may include the third region 1513 disposed between the first and the second regions 1511 and 1512. Such first to third regions 1511,1512, and 1513 may be connected to each other, and may form the continuous body of the display unit 151. In addition, as described above, for the movement of the third region 1513 to the front face or rear face of the mobile terminal 100 based on the movement direction of the second frame 102, the first region 1511 may be fixed so as not to move on the front face of the mobile terminal 100, and the second region 1512 may be provided movably on the rear face of the mobile terminal. Such configuration of the display unit 151 will be described in more detail below.

The first region 1511 may be disposed on the front face of the mobile terminal 100, and more specifically, on the front face of the first frame 101, that is, the first front portion 1011. The first region 1511 is fixed to the first frame 101, that is, the front face of the first front portion 1011 so as not to move even when the second frame 102 moves. Accordingly, the first region 1511 may always be exposed on the front face of the mobile terminal 100. The third region 1513 may be adjacent to the first region 1511, and may extend into the second frame 102 to be wound on the roller 1028. The third region 1513 may continuously extend out of the second frame 102 again and partially cover the second frame 102, that is, the rear face of the third rear portion 1022. In one example, the second frame 102, that is, the third rear portion 1022 is adjacent to the first frame 101, that is, the second rear portion 1013 and forms a rear casing of the mobile terminal 100 together with the first frame 101, that is, the second rear portion 1013. Therefore, it may be described that the third region 1513 is also disposed on the rear face of the first frame 101.

The second region 1512 may be adjacent to the third region 1513, and may be disposed on the rear face of the mobile terminal 100, and more specifically, on the second frame, that is, the rear face of the third rear portion 1022 of the second frame. The second region 1512 may be coupled to the third frame 103 rather than directly coupled to the second frame 102. As shown in (b) in FIG. 4, the slot 1025 extending in the lateral direction (i.e., the direction perpendicular to the longitudinal direction of the mobile terminal 100) may be defined in the second frame 102, that is, the third rear portion 1022, and the third frame 103 may move along the slot 1025. In (b) in FIG. 4, the slot 1025 is illustrated as being defined in the rear face of the second frame 102, but may be defined in a side face of the second frame 102. The second region 1512 may move in the first or second direction D1 or D2 with respect to the second frame 102 together with the third frame 103, but a range of the movement of the second region 1512 may be limited to the rear face of the mobile terminal 100 by the slot 1025. That is, the second region 1512 may not move out of the second frame 102 even when the second frame 102 expands or contracts, and may move along the slot 1025 within the second frame 102 by an extended or contracted length of the second frame 102. Thus, the second region 1512 may always be exposed on the rear face of the mobile terminal 100.

As a result, the first region 1511 may be disposed on the front face of the mobile terminal 100 and may always be exposed to the front face regardless of the movement of the second frame 102. The second region 1512 may be disposed on the rear face of the mobile terminal 100 and may always be exposed to the rear face regardless of the movement of the second frame 102. In addition, the third region 1513 may be disposed between the first and second regions 1511 and 1512, and may be selectively disposed on the front or rear face of the mobile terminal 100 based on the movement directions D1 and D2 of the second frame 102.

Because of such selective disposition of the third region 1513, as shown in FIG. (b) in FIG. 4, the second rear portion 1013 of the first frame 101 may be covered by the second and third regions 1512 and 1513 of the display unit 151 and the third rear portion 1022 in the first state, but may be exposed to the outside of the mobile terminal 100 in the second state because the third region 1513 moves to the front face of the mobile terminal 100 and the third rear portion 1022 also moves in the first direction D1. In addition, the second front portion 1021 of the second frame 102 may be disposed below the first front portion 1011 of the first frame 101 in the first state, but the second front portion 1021 may be moved out of the first frame 101 in the second state to support the third region 1513 of the display unit 151 disposed on the front face of the mobile terminal 100.

The first and second regions 1511 and 1512 are always respectively arranged on the front face and the rear face of the mobile terminal 100, so that curvatures of the first region 1511 and the second region 1512 may not be changed and maintained in a flat basic state. However, the third region 1513 may be wound on the roller 1028 and bent within the second frame 102. When switching from the first state to the second state, the third region 1513 may be extended from the second frame 102 to the front face of the mobile terminal 100 while being wound in one direction on the roller 1028. On the other hand, when switching from the second state to the first state, the third region 1513 may contract to the second frame 102 from the front face of the mobile terminal 100 while being wound on the roller 1028 in the opposite direction. At the same time, the third region 1513 may return to the rear face of the mobile terminal 100 from the second frame 102. Only a specific position of a foldable mobile terminal in a form of being unfolded like a book is repeatedly folded, so that the specific position thereof is likely to be damaged. On the other hand, a deformed portion of the flexible display unit 151, that is, a portion wound on the roller 1028 may be changed based on the first and second states of the mobile terminal 100, that is, the movement of the second frame 102. Therefore, the mobile terminal 100 according to the present disclosure may significantly reduce deformation and fatigue repeatedly applied to a specific portion of the display unit 151, thereby preventing damage to the display unit 151.

Based on the above-described configuration, an overall operation of the mobile terminal 100 will be described as follows. As an example, the switching of the state may be manually performed by the user, and an operation of the mobile terminal 100 during such manual state switching will be described. However, operations of the first to third frames 101 to 103 and the display unit 151 to be described below may be performed in the same manner when a power source other than the force of the user is used, for example, when the driving unit 200 to be described below is applied.

As shown in (a) in FIG. 3, (a) in FIG. 4, and (a) in FIG. 5, the second frame 102 is completely contracted into the first frame 102 in the first state. Therefore, only the first region 1511 of the display unit 151 fixed to the front face of the first frame 101 may be exposed to the front face of the mobile terminal 100. Such first region 1511 may be fixed to and supported by the first frame 101, that is, the first front portion 1011 of the first frame 101. In addition, a great portion of the third region 1513 is disposed on the rear face of the mobile terminal 100 together with the second region 1512, and may be disposed in the second frame 102 in a state of being partially wound on the roller 1028. The third region 1513 on the rear face of the mobile terminal 100 may be supported by the second frame, that is, the third rear portion 1022 of the second frame. The second region 1512 may be fixed by the third frame 103 disposed on the second frame (i.e., the third rear portion 1022), and may be movably coupled to the second frame 1012.

In such first state, when the second frame 102 moves in the first direction D1, the mobile terminal 100 may be switched to the second state. As shown in (b) in FIG. 3, (b) in FIG. 4, and (b) in FIG. 5, the second frame 102 may be extended from the first frame 101 by the movement in the first direction D1, and may increase an overall size of the mobile terminal 100, in particular, a size of the front face of the mobile terminal 100. During such movement in the first direction D1, the second frame 102 may apply the force, that is, the tension, to the display unit 151 in the first direction D1. The display unit 151 is fixed to the first frame 101, but is movably coupled to the second frame 102 using the third frame 103. Thus, the third region 1513 may be rolled out from the roller 1028 in the second frame 102 to the front face of the mobile terminal 100 by the force applied by the second frame 102. That is, the third region 1513 may be withdrawn or pulled out, extended, or moved out from the second frame 102. At the same time, the third region 1513, particularly a portion of the third region 1513 disposed on the rear face of the mobile terminal 100, may be rolled into the second frame 102, or inserted or pushed in, retracted, or moved into the second frame 102. An entirety of the third region 1513 may not be withdrawn from the second frame 102 to the front face of the mobile terminal 100, and a portion of the third region 1513 may still be disposed in the second frame 102 in a state of being wound on the roller 1028. In addition, for the smooth movement of such third region 1513, the second region 1512 may also move in the first direction D1 with respect to the second frame 102 along with the third frame 103. In addition, as described above, the second region 1512 and the third frame 103 may be constrained to the second frame 102 and move in the first direction D1 with respect to the first frame 101 together with the second frame 102. Accordingly, the second region 1512 and the third frame 103 may move relatively in the first direction D1 with respect to the first frame 101 as well as to the second frame 102. Accordingly, a moved distance of the second region 1512 and the third frame 103 may be greater than a moved distance of the second frame 102. Therefore, because of the movement of the long distance in the first direction D1 of the second region 1512, the third region 1513 may be smoothly expanded to the front face of the mobile terminal 100. In addition, for the movement of the third region 1513 proportional to the expansion of the second frame 102, the movement of the second region 1512 and the third frame 103 in the first direction D1 may be simultaneously performed with the movement of the third region 1512 and the second frame 102 so as to be proportional to the movement of the third region 1512 and the second frame 102.

When the second frame 102 is completely expanded in the first direction D1, the first and third regions 1511 and 1513 are arranged on the front face of the mobile terminal 100, and only the second region 1512 may be disposed on the rear face of the mobile terminal 100. Such first and third regions 1511 and 1513 may be supported by the first frame (i.e., the first front portion 1011 thereof) and the second frame (i.e., the second front portion 1021 thereof). In addition, the second frame 102, that is, the third rear portion 1022 thereof may expose the second rear portion 1013 of the first frame while expanding in the first direction D1 and may support the moving third region 1513. Therefore, in the second state, the mobile terminal 100 may have the expanded front face display unit 151.

On the other hand, when the second frame 102 moves in the second direction D2 in the second state, the mobile terminal 100 may return to the first state again as illustrated in (a) in FIG. 3, (a) in FIG. 4, and (a) in FIG. 5. The second frame 102 may be contracted into the first frame 101 by the movement in the second direction D2, and may reduce the overall size of the mobile terminal 100, in particular, the front face of the mobile terminal 100. During such movement of the second frame 102, the movement of the display unit 151 may be performed in a reverse order to the movement in the first direction D1 described above. Briefly, the third region 1513 may be rolled into the second frame 102 and wound on the roller 1028 from the front face of the mobile terminal 100 or may be inserted, retracted, or moved into the second frame 102. At the same time, the third region 1513 may be rolled out, withdrawn or pulled out, or moved out to the rear face of the mobile terminal 100 from the roller 1028 of the second frame 102. Not the entirety of the third region 1513 is withdrawn from the second frame 102 to the rear face of the mobile terminal 100. A portion of the third region 1513 may still be disposed in the second frame 102 in a state of being rolled on the roller 1028. In addition, for the smooth movement of such third region 1513, the second region 1512 may also move in the second direction D2 with respect to the second frame 102 along with the third frame 103. The second region 1512 and the third frame 103 may be constrained to the second frame 102 and move in the second direction D2 with respect to the first frame 101 together with the second frame 102. Accordingly, the second region 1512 and the third frame 103 may move relatively in the second direction D2 with respect to the first frame 101 as well as the second frame 102. Accordingly, a moved distance of the second region 1512 and the third frame 103 in the second direction D2 may be greater than a moved distance of the second frame 102 in the second direction D2. Therefore, because of the movement of the long distance of the second region 1512, the third region 1513 may smoothly return to the rear face of the mobile terminal 100. In addition, for the movement of the third region 1513 proportional to the contraction of the second frame 102, the movement of the second region 1512 and the third frame 103 in the second direction D2 may be simultaneously performed with the movement of the third region 1512 and the second frame 102 so as to be proportional to the movement of the third region 1512 and the second frame 102. When the second frame 102 is completely contracted in the second direction D2, the mobile terminal 100 may be switched to the first state as described above and may have the front face display unit 151 that is relatively contracted in the first state compared to the second state.

FIGS. 6 and 7 are cross-sectional perspective views of a section including a connection band in a mobile terminal in accordance with the present disclosure. Specifically, FIG. 6 is a cross-sectional perspective view in a case in which a mobile terminal in accordance with the present disclosure is in a first state, and FIG. 7 is a cross-sectional perspective view in a case in which a mobile terminal in accordance with the present disclosure is in a second state.

The mobile terminal according to the present disclosure may include the first frame 101 and the second frame 102 movably coupled to the first frame 101 in the first direction D1 or in the second direction D2 opposite to the first direction D1.

The first frame 101 according to the present disclosure may include the first front portion 1011 disposed at the front portion, the first rear portion 1012 and the second rear portion 1013 arranged at the rear portion. In the first frame 101 according to the present disclosure, the first front portion 1011 and the first and second rear portions 1012 and 1013 may be spaced apart from each other to define a predetermined space therebetween. In this connection, a spacing between the first front portion 1011 and the first rear portion 1012 may be greater than a spacing between the first front portion 1011 and the second rear portion 1013. The camera 121 may be disposed on the first rear portion 1012 according to the present disclosure and the second rear portion 1013 may include a guide 1015 for guiding a third rear portion 1023 of the second frame 102. The first frame 101 according to the present disclosure may be connected to the first front portion 1011 and the first rear portion 1012 and/or the second rear portion 1013 by the side portion 1014.

The second frame 102 according to the present disclosure may include the third rear portion 1023 moving along the rear face of the first frame 101 and the first roller 1028 disposed on the third rear portion 1023 at the end in the first direction D1 of the second frame 102. In this connection, the first roller 1028, which is surrounded by the flexible display unit 151, may rotate in response to the change in the shape of the flexible display unit 151. The second frame 102 according to the present disclosure may include a second roller 1026 at an end in the second direction D2 of the second frame 102. In this connection, the second roller 1026, which is surrounded by a connection band 310 to be described below, may rotate in response to a change in a shape of the connection band 310.

The mobile terminal according to the present disclosure may include the driving unit 200 that moves the second frame 102 in the first direction D1 or in the second direction D2.

The mobile terminal according to the present disclosure may include the third frame 103 that moves along the rear face of the third rear portion 1023 of the second frame 102. The third frame 103 may move in the first direction D1 or the second direction D2 along a slit (not shown) defined in the third rear portion 1023.

The mobile terminal according to the present disclosure may include the flexible display unit 151 having one end fixed to the front face of the first frame 101 and surrounding the first roller 1028. The other end of the flexible display unit 151 may be fixed to the third frame 103 to move in the first direction D1 or the second direction D2.

The mobile terminal according to the present disclosure may include the flexible display unit 151 of a certain size. Therefore, in the mobile terminal according to the present disclosure, when the second frame 102 moves in the first direction D1, a portion of the flexible display unit 151 exposed in a front face direction may be expanded and a portion of the flexible display unit 151 exposed in a rear face direction may be contracted. Similarly, in the mobile terminal according to the present disclosure, when the second frame 102 moves in the second direction D2, the portion of the flexible display unit 151 exposed in the front face direction may be contracted and the portion of the flexible display unit 151 exposed in the rear face direction may be expanded. Specifically, FIG. 6 illustrates the mobile terminal in the first state in which the portion of the flexible display unit 151 exposed in the front face direction is contracted and the portion of the flexible display unit 151 exposed in the rear face direction is expanded. In addition, FIG. 7 illustrates the mobile terminal in the second state in which the portion of the flexible display unit 151 exposed in the front face direction is expanded and the portion of the flexible display unit 151 exposed in the rear face direction is contracted.

The mobile terminal according to the present disclosure may include the connection band 310 surrounding an end in the second direction D2 of the third rear portion 1023, and having one end connected to the end in the first direction D1 of the first frame 101 and the other end connected to the other end of the flexible display unit 151. The connection band 310 according to the present disclosure may have a uniform length, and may provide a tension in the second direction D2 to the other end of the flexible display unit 151. Specifically, the connection band 310 may be provided to surround the second roller 1026 disposed in the second direction D2 of the second frame 102.

Specifically, in the connection band 310 according to the present disclosure, one end thereof may be fixed to the driving unit 200 fixed to the end in the first direction D1 of the first frame 101, and the other end thereof may be connected to the end of the flexible display panel 151.

Hereinafter, an operation principle of the connection band 310, a coupling structure of the connection band 310, and a structure for providing the tension to the flexible display unit 151 through the connection band 310 will be described in detail.

FIG. 8 is a conceptual diagram for describing an operation of a connection band that provides a tension to a flexible display unit in a mobile terminal in accordance with the present disclosure. Hereinafter, a description will be achieved with reference to a configuration illustrated in the drawing.

The connection band 310 according to the present disclosure has a fixed length. One end 310a of the connection band 310 may be connected to the end of the flexible display unit 151, and the other end 310b thereof may be connected to the end in the first direction D1 of the first frame 101. In this connection, the end of the flexible display unit 151 to which one end 310a of the connection band 310 is connected may be the other end of the flexible display unit 151 symmetrical to one end of the flexible display unit 151 fixed to the front face of the first frame 101.

(a) in FIG. 8 illustrates the connection band 310 when the mobile terminal according to the present disclosure is in the first state. In the first state, the connection band 310 may have a length from the second roller 1026 to one end 310a smaller than a length from the second roller 1026 to the other end 310b. Specifically, in the first state, one end 310a of the connection band 310 may be adjacent to the second roller 1026.

(b) in FIG. 8 illustrates the connection band 310 when the mobile terminal according to the present disclosure is switched from the first state to the second state. When the mobile terminal is switched from the first state to the second state, the second roller 1026 may move in the first direction D1, and one end 310a of the connection band 310 may move in the first direction D1 by a distance that the second roller 1026 moves in the first direction D1. In this case, the other end 310b of the connection band 310 may be fixed to the first frame 101 or a tension adjustment member 310 fixed to the first frame 101 and maintained in the fixed state.

(c) in FIG. 8 illustrates the connection band 310 when the mobile terminal according to the present disclosure is switched from the second state to the first state. In the second state, the connection band 310 may have the length from the second roller 1026 to one end 310a greater than the length from the second roller 1026 to the other end 310b. Specifically, in the second state, the other end 310b of the connection band 310 may be adjacent to the second roller 1026. When the mobile terminal is switched from the second state to the first state, the second roller 1026 may move in the second direction D2, and one end 310a of the connection band 310 may move in the second direction D2 by a distance that the second roller 1026 moves in the second direction D2. In this case, the other end 310b of the connection band 310 may be fixed to the first frame 101 or the tension adjustment member 310 fixed to the first frame 101 and maintained in the fixed state.

FIG. 9 is a transparent perspective view for describing a connection structure of a connection band in a mobile terminal in accordance with the present disclosure. FIG. 10 is a perspective view of some components expanded and viewed from one direction in a mobile terminal in accordance with the present disclosure. FIG. 11 is a perspective view illustrating some components illustrated in FIG. 10 in a manner of dividing the components based on an operation state, in a mobile terminal in accordance with the present disclosure.

The mobile terminal according to the present disclosure may include the connection band 310 together with the driving unit 200 to increase a space utilization of the mobile terminal or to facilitate manufacture and fixation of the mobile terminal.

The driving unit 200 according to the present disclosure may be disposed in the first direction D1 of the first frame 101 and include a pinion gear 210 rotating in the first direction D1 or the second direction D2 and a motor assembly 220 for controlling the rotation of the pinion gear 210.

The first frame 101 according to the present disclosure may include a rack gear 1027 engaged with the pinion gear 210 of the driving unit 200 on the front face of the third rear portion 1023. In the first frame 101 according to the present disclosure, the rack gear 1027 disposed on the front face of the third rear portion 1023 may be engaged with the pinion gear 210 of the driving unit 200 and move in the first direction D1 or the second direction D2.

The rack gear 1027 according to the present disclosure may include the second roller 1026 surrounded by the connection band 310 and rotating at an end in the second direction D2 of the rack gear 1027. In addition, the rack gear 1027 according to the present disclosure may include a support member 1028 providing elasticity in the second direction D2 to the second roller 1026. A structure associated with the support member 1028 will be specifically described with reference to FIGS. 12 to 14.

The first frame 101 according to the present disclosure may include a guide hole 1013a defined in the second rear portion 1013 overlapping with the third rear portion 1023 of the second frame 102. The rack gear 1027 disposed on the front face of the third rear portion 1023 may be inserted into the guide hole 1013a according to the present disclosure, and the guide hole 1013a may guide the movement of the rack gear 1027 in the first direction D1 or the second direction D2.

The motor assembly 220 according to the present disclosure may include a motor 221 that provides a rotation power to the pinion gear 210 and a motor casing 222 that mounts the motor 221 therein. The motor casing 222 according to the present disclosure may include a guide groove 223 for supporting the rack gear 1027 and guiding the movement in the first direction D1 or the second direction D2 of the rack gear 1027.

That is, in the present disclosure, the rack gear 1027 disposed on the second frame 102 may be inserted into the guide hole 1013a defined in the second rear portion 1023 of the first frame 101, supported by the guide groove 223 defined in the motor casing 222, and guided in the first direction D1 or the second direction D2 corresponding to a rotation direction of the motor 221.

In the connection band 310 according to the present disclosure, one end thereof may be fixed to the end of the flexible display unit 151 (specifically, the third frame 103 disposed at the end of the flexible display unit 151) and surround the second roller 1026 disposed at the end in the second direction D2 of the rack gear 1027, and the other end thereof may be fixed to the motor casing 222 of the driving unit 200. A structure in which the end of the connection band 310 is coupled to the motor casing 222 will be specifically described with reference to FIG. 15.

FIG. 12 is a transparent perspective view of an enlarged portion E in FIG. 11 in the mobile terminal in accordance with the present disclosure. FIG. 13 is an enlarged side view of a component in FIG. 12 in the mobile terminal in accordance with the present disclosure. FIG. 14 is a conceptual diagram for describing a function of some components in FIG. 13 in the mobile terminal in accordance with the present disclosure.

In the mobile terminal according to the present disclosure, the connection band 310 may elastically support the second roller 1026 surrounded by the connection band 310 to provide the tension in the second direction D2 to the flexible display unit 151 connected to the connection band 310.

The mobile terminal according to the present disclosure may include the support member 1028 that provides the elasticity in the second direction D2 to the second roller 1026 surrounded by the connection band 310. Specifically, the mobile terminal according to the present disclosure may include a groove 1027b into which the support member 1028 and the second roller 1026 may be mounted at the end in the second direction D2 of the rack gear 1027. The second roller 1026 according to the present disclosure may be detachably attached to the groove 1027b of the rack gear 1027. In this connection, the support member 1028 disposed in the groove 1027b of the rack gear 1027 may prevent the second roller 1026 from deviating from the attached state, and may move in the second direction D2 in a process of being attached to the groove 1027b of the rack gear 1027. Specifically, a maximum distance that the second roller 1926 may move in the second direction D2 while being surrounded by the connection band 310 may be increased using the support member 1028.

The support member 1028 according to the present disclosure may include a shaft fixing portion 1028a for surrounding a portion of a rotation shaft of the second roller 1026, and a shaft support portion 1028b for elastically supporting the shaft fixing portion 1028a in the second direction D2. In the support member 1028 according to the present disclosure, the shaft fixing portion 1028a and the shaft support portion 1028b may be integrally formed by bending a single metal member. For example, in the support member 1028 according to the present disclosure, the shaft fixing portion 1028a and the shaft support portion 1028b may be integrally formed by bending the single metal member in an S shape.

In the support member 1028 according to the present disclosure, the shaft fixing portion 1028a and the shaft support portion 1028b may be connected to each other through a connection portion 1028c. Specifically, the shaft support portion 1028b may be disposed to be directed in the first direction D1 at one end of the shaft fixing portion 1028a, and the connection portion 1028c may correspond to a portion to which the shaft fixing portion 1028*a* and shaft support portion 1028*b* are connected.

The connection portion 1028*c* according to the present disclosure may be disposed to be directed in the second direction D2. Specifically, a portion F of the connection portion 1028*c*, which protrudes the most in the second direction D2 may be more directed in the second direction D2 than a portion G, which is recessed the most in the first direction D1, of a face facing the second roller 1026 of the shaft fixing portion 1028*a*.

Because of the structure of the support member 1028, the second roller 1026 according to the present disclosure may be moved in the second direction D2 and fixed in a process of being attached to the rack gear 1027 while being surrounded by the connection band 310, and may be prevented from deviating from the rack gear 1027.

The process of attaching the second roller 1026 according to the present disclosure to the rack gear 1027 will be described in detail with reference to FIG. 14. (a) in FIG. 14 illustrates a state in which the second roller 1026 is deviated from the rack gear 1027 in a state of being surrounded by the connection band 310. (b) in FIG. 14, which is a process of attaching the second roller 1026 to the rack gear 1027 in a state of being surrounded by the connection band 310, illustrates a state in which a pressure is applied in the first direction D1 to the connection portion 1028*c* of the support member 1028. In this connection, the shaft of the second roller 1026 may move in the second direction D2 by a restoring force of the connection portion 1028*c*. (c) in FIG. 14 illustrates a state in which the second roller 1026 is attached to the rack gear 1027 in a state of being surrounded by the connection band 310. In this connection, the second roller 1026 may be attached to the rack gear 1027 in a state in which the shaft thereof is moved in the second direction D2 more than (c) in FIG. 14, and may be prevented from being deviated from the rack gear 1027 because of the connection portion 1028*c* of the support member 1028.

FIG. 15 is a cross-sectional view including a connection band in a mobile terminal in accordance with the present disclosure. (a) in FIG. 15 and (b) in FIG. 15 respectively correspond to FIG. 6 and FIG. 7. An additional content will be described below.

In the mobile terminal according to the present disclosure, a portion of the connection band 310 may be disposed in a mounting space defined by the first frame 101. Specifically, the connection band 310 of the mobile terminal according to the present disclosure may be disposed such that a section thereof connected to the driving unit 200 on the second roller 1026 traverses the mounting space of the first frame 101. In this connection, the mounting space defined by the first frame 101 according to the present disclosure may have poor space utilization to secure a driving space of the connection band 310. As a result, this may cause a problem that the volume of the mobile terminal increases.

In order to prevent the above problem, the driving unit 200 according to the present disclosure may fix the end of the connection band 310 to be spaced apart from the rear face of the first front portion 1011 of the first frame 101. Specifically, the driving unit 200 according to the present disclosure may include a connection portion 334 to which the end of the connection band 310 is connected at the motor casing 222, and the connection portion 334 may be disposed to be spaced apart from the rear face of the first front portion 1011 of the first frame 101. FIG. 15 illustrates an embodiment in which the end of the connection band 310 fixed to a connection portion 224 is spaced apart from the rear face of the first front portion 101 by hl.

The present disclosure allows the end of the connection band 310 fixed to the connection portion 224 of the driving unit 200 to be spaced apart from the rear face of the first front portion 1011 of the first frame 101 as much as possible, thereby increasing the space utilization of the mounting space defined by the frame 101 to prevent the volume of the mobile terminal from increasing.

The above detailed description should not be construed as limiting in all aspects and should be considered illustrative. The scope of the present disclosure should be determined by rational interpretation of the appended claims, and all changes within the equivalent scope of the present disclosure are included in the scope of the present disclosure.

What is claimed is:

1. A mobile terminal comprising:
a first frame;
a second frame coupled to the first frame in a manner of being extendable in a first direction, wherein the second frame includes a first rear portion moving along a rear face of the first frame and a first roller disposed on the first rear portion at an end in the first direction of the second frame;
a flexible display unit having one end fixed to a front face of the first frame and surrounding the first roller;
a driving unit fixed to the first frame and moving the second frame in the first direction or in a second direction opposite to the first direction; and
a connection band for surrounding an end in the second direction of the first rear portion, wherein the connection band has one end connected to the driving unit and an other end fixed to the other end of the flexible display unit.

2. The mobile terminal of claim 1, wherein the connection band has a uniform length, and provides a tension in the second direction to the other end of the flexible display unit.

3. The mobile terminal of claim 1, further comprising:
a third frame connected to the other end of the flexible display unit, and moving in the first direction or in the second direction along a rear face of the first rear portion,
wherein the other end of the connection band is coupled to an end in the second direction of the third frame.

4. The mobile terminal of claim 1, wherein the first rear portion includes a second roller surrounded by the connection band and rotating at the end in the second direction of the first rear portion.

5. The mobile terminal of claim 4, wherein the first rear portion includes a support member for providing elasticity in the second direction to the second roller.

6. The mobile terminal of claim 5, wherein the support member includes:
a shaft fixing portion for surrounding at least a portion of a rotating shaft of the second roller; and
a shaft support portion for elastically supporting the shaft fixing portion in the second direction.

7. The mobile terminal of claim 6, wherein the shaft fixing portion and the shaft support portion are integrally formed by bending a single metal member in the support member.

8. The mobile terminal of claim 7, wherein a connection portion for connecting the shaft fixing portion and the shaft support portion with each other is formed to be directed in the second direction in the support member.

9. The mobile terminal of claim 4, wherein the driving unit includes:
a pinion gear for rotating in the first direction or in the second direction; and a motor assembly for controlling a rotation of the pinion gear, wherein the first rear portion includes a rack gear engaged with the pinion gear on a front face thereof.

10. The mobile terminal of claim 9, wherein the second roller is disposed at an end in the second direction of the rack gear.

11. The mobile terminal of claim 10, wherein the first frame includes:

a first front portion for fixing the one end of the flexible display unit thereto; and a second rear portion spaced apart from the first front portion to define therebetween a mounting space for mounting the driving unit therein, wherein the second rear portion is in contact with the first rear portion, wherein the second rear portion includes a guide hole for inserting the rack gear therein and for guiding a movement of the rack gear in the first direction or in the second direction.

12. The mobile terminal of claim 11, wherein the motor assembly includes:

a motor for providing a rotation power to the pinion gear; and a motor casing for mounting the motor therein, wherein the motor casing includes a guide groove for supporting the rack gear and guiding the movement of the rack gear in the first direction or in the second direction.

13. The mobile terminal of claim 12, wherein the motor casing includes a connection portion to be connected to the one end of the connection band, wherein the connection portion is spaced apart from a rear face of the first front portion.

* * * * *